United States Patent [19]
Tajima et al.

[11] Patent Number: 6,009,782
[45] Date of Patent: Jan. 4, 2000

[54] TABLE SAW

[75] Inventors: Nobuo Tajima; Katsuji Haneda; Seiichi Mineda, all of Anjo, Japan

[73] Assignee: Makita Corporation, Anjo, Japan

[21] Appl. No.: 09/099,150

[22] Filed: Jun. 18, 1998

[30] Foreign Application Priority Data

Jun. 19, 1997 [JP] Japan ................................. 9-178902

[51] Int. Cl.⁷ ............................................... B26D 7/18
[52] U.S. Cl. ............................. 83/99; 83/471.3; 83/477.2
[58] Field of Search .......................... 83/99, 168, 471.3, 83/468.7, 490, 100, 477.2, 169

[56] References Cited

U.S. PATENT DOCUMENTS

| | | | |
|---|---|---|---|
| 3,669,163 | 6/1972 | Crane | 83/168 |
| 4,063,478 | 12/1977 | Stuy | 83/168 |
| 4,414,743 | 11/1983 | Pioch et al. | 83/100 |
| 4,934,233 | 6/1990 | Brundage et al. | 83/468.7 |
| 5,084,972 | 2/1992 | Waugh | 83/168 |
| 5,123,317 | 6/1992 | Barnes, Jr. et al. | 83/98 |
| 5,158,001 | 10/1992 | Udelhofen et al. | 83/168 |
| 5,230,269 | 7/1993 | Shiotani et al. | |
| 5,379,668 | 1/1995 | Standing | 83/99 |
| 5,638,731 | 6/1997 | Garuglieri | 83/490 |
| 5,819,619 | 10/1998 | Miller et al. | 83/468.7 |

FOREIGN PATENT DOCUMENTS

| | | |
|---|---|---|
| 1 808 138 | 8/1969 | Germany . |
| 1 628 887 | 8/1971 | Germany . |
| 35 00 371 A1 | 7/1986 | Germany . |
| 38 43 236 A1 | 6/1990 | Germany . |
| 295 01 506 | 5/1995 | Germany . |

*Primary Examiner*—M. Rachuba
*Assistant Examiner*—Sean Pryor
*Attorney, Agent, or Firm*—Davis and Bujold

[57] ABSTRACT

A table saw has a motor driven rotary blade disposed in a blade case and vertically adjustable with respect thereto. During cutting, wood chips are expelled from the blade case even when the rotary blade is vertically disposed away from a bottom of the blade case. An air current, provided by a fan driven by the motor, is blown from a motor gear housing and guided to the blade case via a plurality of guide members. The air current subsequently blows along an inner surface of the blade case in order to blow the wood chips out a chip discharge port.

9 Claims, 7 Drawing Sheets

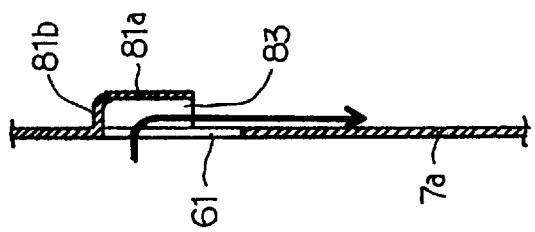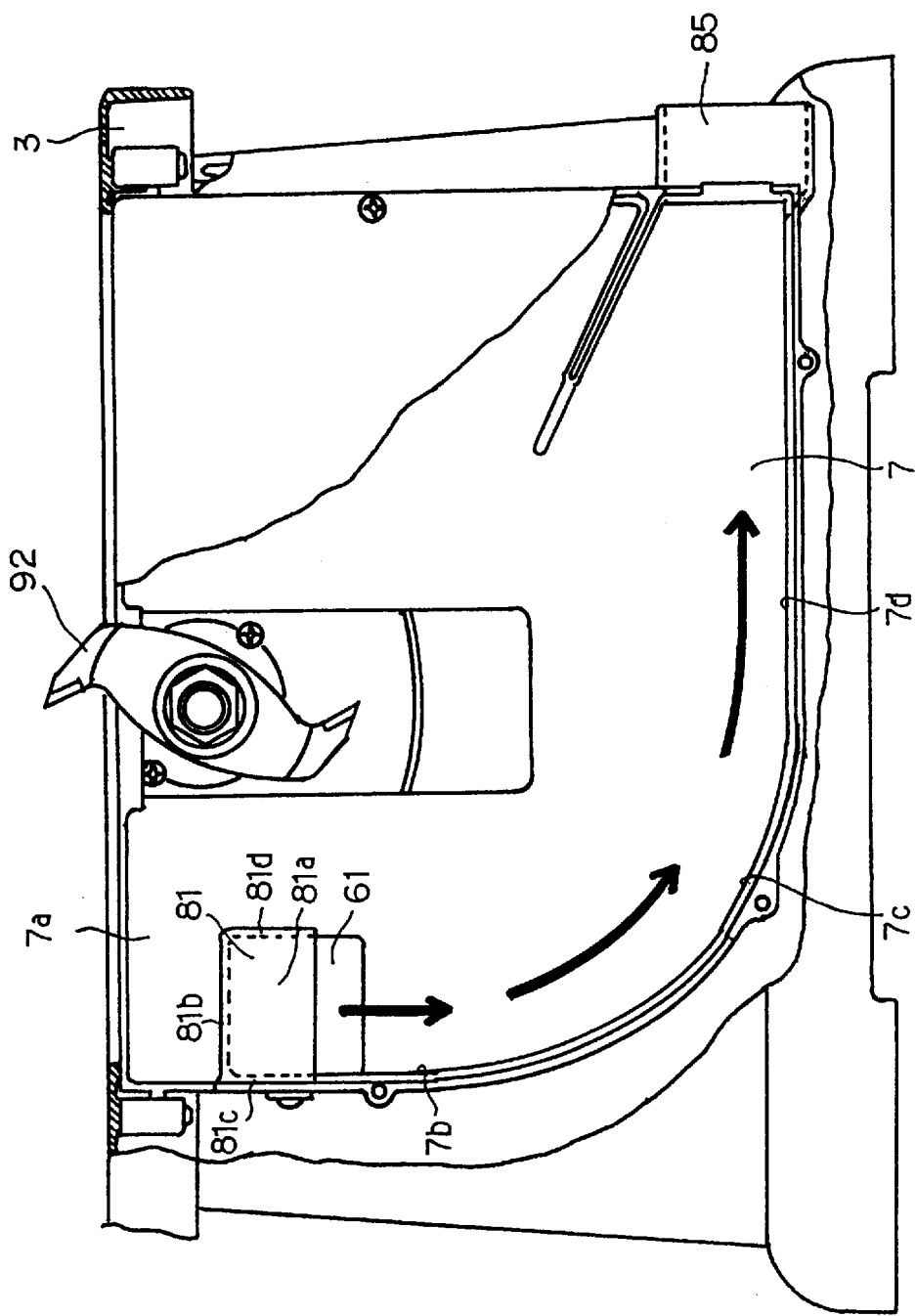

TABLE SAW

BACKGROUND OF THE INVENTION

1. Field of the Invention

The present invention relates to a table saw, particularly to a table saw which has a characteristic structure for discharging chips.

2. Description of the Related Arts

In a conventional table saw shown in FIG. 7A, by using an air current which is generated when a circular saw blade 105 is rotated, chips 103 dropped down into a blade case 101 of a table saw 100 are discharged via a rear discharge port 107.

As shown in FIG. 7B, however, when a grooving blade 111 or another small-diameter rotary blade is used, a sufficiently strong air current is not generated in the blade case 101 and there arises a problem in that chips 103 are left in the blade case 101.

Also, as shown in FIG. 7C, even when the large-diameter circular saw blade 105 is used, in some cases, when the circular saw blade 105 is lifted up for cutting or processing otherwise thick wood, insufficient air current is generated and there also arises the problem that chips 103 are left in the blade case 101.

Especially, it is difficult to discharge wet chips or wide chips which result from grooving or the like. Also, when the circular saw blade 105 is raised to cut thick wood, a large quantity of chips are generated which are difficult to discharge. Further, when a large quantity of chips 103 have accumulated in the blade case 101, the chips may be blown upward as the circular saw blade 105 rotates. This disadvantageously limits operation.

On the other hand, as clearly seen from FIGS. 7B and 7C, chips 103 tend to be left in a front bottom portion of the blade case 101. There chips cannot be easily removed even by inserting a tool via the discharge port 107. Accordingly, in a conventional table saw, chips 103 sometimes need to be removed from the blade case 101, for example, by opening a lid of the blade case 101. Operational efficiency is thus reduced.

SUMMARY OF THE INVENTION

An object of the present invention is to provide a table saw in which chips are prevented from being left in a blade case even when a small-diameter rotary blade is used or a normally sized rotary blade is operated in a raised position.

To attain this and other objects, the present invention provides a table saw which has a rotary blade operated by a motor. The rotary blade can be raised to or lowered to a desired height from a top surface of a table. A cooling air current for the motor is introduced into a blade case which covers a substantially lower half of the rotary blade to propel the chips produced by the blade toward and out of a chip discharge port.

According to the table saw, when wood or another material is cut or grooved, the cooling air current which is generated by the rotation of the motor is supplied into the blade case. Then, in the blade case the cooling air current propels the chips toward and out of the chip discharge port. Therefore, even if an interval between the rotary blade and a bottom of the blade case is so long that only a weak air current is generated in a chip discharge direction by the rotary blade, the chips can be propelled toward and out of the discharge port by the cooling air current for the motor. Therefore, the chips are prevented from being deposited in the blade case.

Specifically, in the table saw of the invention, the chip discharge port is provided in a rear bottom portion of the blade case. The table saw is also provided with a cooling air current guide path for guiding the cooling air current out of the motor toward a front side of the blade case and for supplying the cooling air current from an upper front portion of the blade case into the blade case. Further, a downward blowout port is provided for blowing the cooling air current downward along a front wall of the blade case from the cooling air current guide path to the upper front portion of the blade case.

Here, in the blade case the rotary blade is rotated from a front side into which material is fed toward a rear side. Therefore, the chips thrown down into the blade case by the rotary blade enter the blade case via the front side and are blown along a tangent line of the rotary blade. Then, in the table saw, the cooling air current generated by a motor cooling fan is guided out of the motor along the cooling air current guide path, and supplied into the blade case via the upper front portion thereof. The cooling air current supplied to the upper front portion of the blade case in this manner is passed downward via the downward blowout port along the front wall of the blade case. As a result, in the blade case, the cooling air current first flows downward along the front wall and then flows from a front bottom portion along a bottom face of the blade case toward a rear chip discharge port. Consequently, the chips which are to be deposited in the blade case are blown along the bottom face of the blade case toward the discharge port by the cooling air current for the motor.

Also, in the constitution, by supplying the cooling air current from the upper front portion of the blade case, the cooling air current can flow securely along the front wall. Therefore, it is difficult to generate an air current which disperses the chips, for example, an air current which blows from a vicinity of the bottom face of the blade case and is reflected by the bottom face to disperse the chips upward. Additionally, by curving a corner of the front bottom portion of the blade case, an air current can be preferably formed which smoothly flows from the upper front portion via the front bottom portion toward the discharge port.

Specifically, in the table saw, the motor and the rotary blade are attached for vertical movement relative to the blade case. The cooling air current guide path is formed by an opening formed in a front wall of a gear housing of the motor, a first guide plate being attached to the gear housing for guiding the cooling air current forward along an outer side of the blade case from the opening of the gear housing, a through hole being formed through the upper front portion of the blade case, and a second guide plate covering the through hole outside the blade case and extending rearward in such a manner that the second guide plate overlaps a tip end of the first guide plate. The downward blowout port is defined by a cover member which surrounds the through hole inside the blade case and which has an opening in its lower portion. When the motor and the rotary blade are moved vertically relative to the blade case, the first and second guide plates can pass each other without obstructing each other.

In the table saw, since the first and second guide plates can pass each other, the rotary blade can be raised or lowered without being prohibited by the cooling air current guide path. The rotary blade is raised or lowered in accordance with the diameter or the type of the rotary blade, the thickness of a material to be processed, a processing method and the like. On the other hand, when the rotary blade is operated in a lowered position, no cooling air current guide path or only an incomplete cooling air current guide path is formed. However, in the operating condition, the rotary blade is positioned close to the bottom face of the blade case. Therefore, an air current produced by the rotary blade itself is intensified. The chips can be discharged through the air current of the rotary blade itself. No big problem arises when the chips are discharged. Also, if the rotary blade is not so large that it is apart from the bottom face of the blade case, a small quantity of chips are generated. Because in this case only a small portion of the rotary blade is exposed. If a small quantity of chips are produced, the chips can be discharged even by the air current made by the rotary blade without causing a large trouble.

Also, when the rotary blade is operated in a raised position, the first and second guide plates overlap each other to form the cooling air current guide path. The cooling air current generated by the motor cooling fan is supplied via the cooling air current guide path into the blade case. Thereafter, an air current is formed flowing downward via the downward blowout port along the front wall of the blade case, and then flows from the front bottom portion along the bottom face of the blade case toward the rear chip discharge port. As a result, when the rotary blade is operated in the raised position, the chips dropping to the bottom face of the blade case are discharged along the air current via the chip discharge port. Additionally, a small-diameter rotary blade is operated necessarily in a raised position. Therefore, in the same manner as when a large-diameter rotary blade is operated in a raised position, a chip discharging air current is formed by the motor cooling air current. The chips are discharged by the air current.

Additionally, when the rotary blade is operated in a position in which the first and second guide plates partially coincide with each other, the cooling air current is slightly incompletely guided by the first and second guide plates to the through hole in the blade case. By supplying the cooling air current via the downward blowout port, the air current is formed in the blade case. The intensity of the air current is slightly weaker than that of the air current which is formed when the first and second guide plates completely overlap each other. However, the chips are reasonably discharged via the discharge port by the air current. In this respect, the chips are prevented from being left in the blade case as compared with the case where the chips are discharged only by the air current generated by the rotary blade.

In the table saw of the invention, the cooling air current guide path is formed by the first guide plate on the side of the gear housing and the second guide plate on the side of the blade case. Therefore, in the table saw provided with a structure for vertically moving the rotary blade, when the rotary blade is operated in the raised position, deposited chips cause a problem. In this case, a strong chip discharging air current is generated. On the other hand, also when the rotary blade is operated in a slightly lowered position, a reasonably strong air current can be generated. Additionally, the first and second guide plates can pass each other without obstructing each other. The vertical movement of the motor and the rotary blade is not prohibited. In a simple structure, a chip discharging air current with a necessary or moderate intensity can be advantageously formed.

BRIEF DESCRIPTION OF THE DRAWINGS

The invention will now be described, by way of example, with reference to the accompanying drawings, in which:

FIG. 4A is a partially sectioned rear view showing an inner structure of a blade case, and FIG. 4B is a sectional view of an air blowout port in the first embodiment.

DETAILED DESCRIPTION OF THE PREFERRED EMBODIMENTS

A first embodiment of the invention will be described with reference to FIGS. 1–5.

Figure 1:
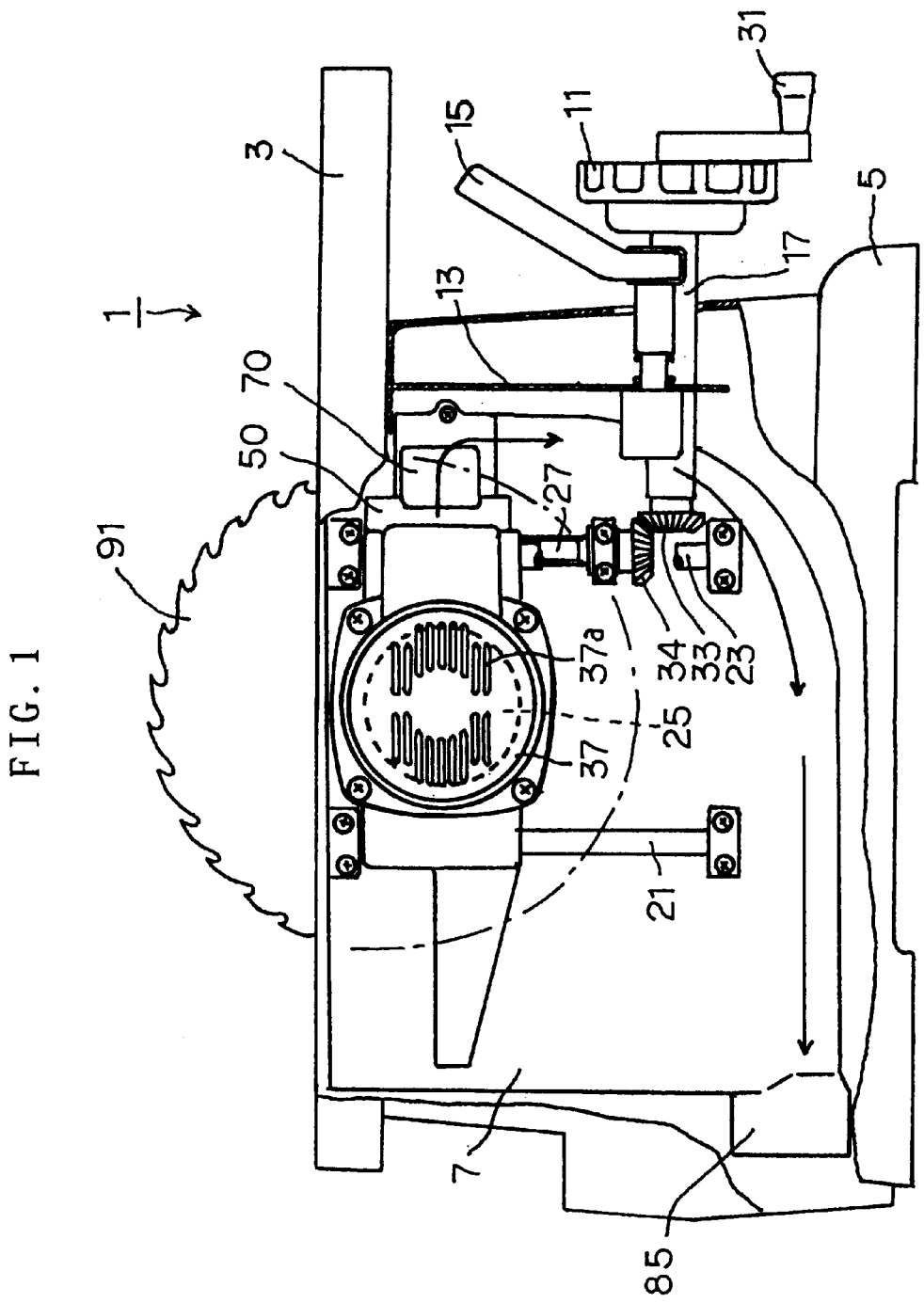
FIG. 1 is a partially sectioned front view of a table saw according to a first embodiment of the invention.

As shown in FIG. 1, a table saw 1 according to the first embodiment is provided with a table 3 and a blade case 7. The blade case 7 is tiltably attached relative to the table 3 in a base 5 for supporting the table 3. In the embodiment, a structure for tilting the blade case 7 is provided with a tilting control 11 extending forward in the base 5, a gear plate 13 fixed on a front face of the blade case 7 and a lock lever 15 for locking the gear plate 13. In the structure, a pinion (not shown) mounted on a rotation axis 17 of the tilting control 11 is engaged with a circular arc gear (not shown) mounted on the gear plate 13. By rotating the tilting control 11, the gear plate 13 is rotated to adjust the tilt angle of the blade case 7. After the tilt angle is adjusted, the lock lever 15 is operated. The blade case 7 can thus be held in a desired tilt condition.

Figure 3:
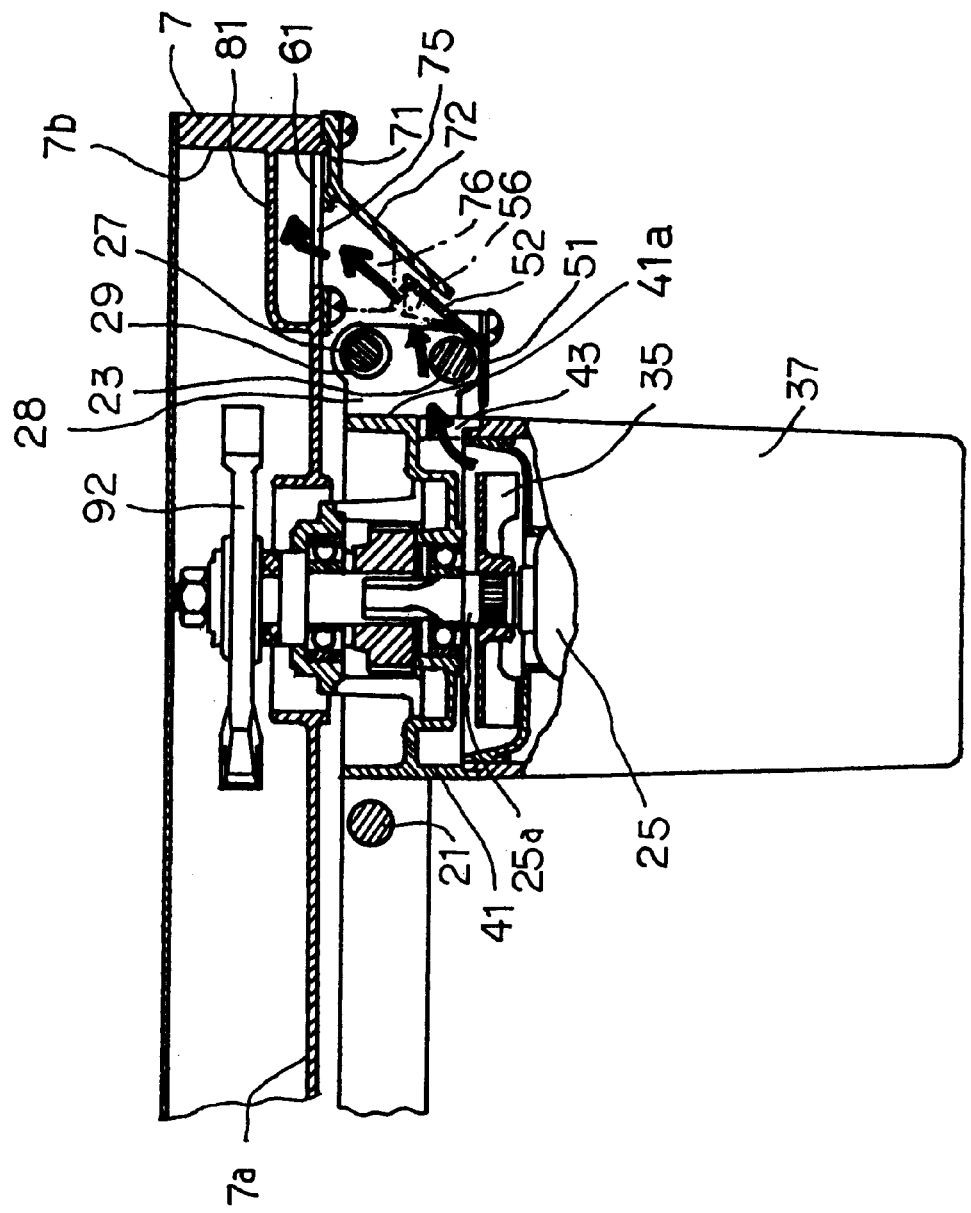
FIG. 3 is a sectional view of a main portion of the table saw according to the first embodiment.

In the blade case 7, as shown in FIG. 1, a motor 25 is vertically movably attached, and guided by two guide bars 21 and 23. As shown in FIG. 3, the motor 25 is engaged via a thread groove 29 formed in a support frame 28 with a screw shaft 27 which is extending parallel with the guide bars 21 and 23. The screw shaft 27 is rotated via bevel gears 33 and 34 by rotating a lifting control 31 which extends from a front of the base 5. When the screw shaft 27 is thus rotated, the motor 25 is moved vertically relative to the blade case 7 by means of the action of a screw feeding mechanism which is constituted of the screw shaft 27 and the thread groove 29. The motor 25 can be moved vertically to a desired height in accordance with the degree of rotation of the lifting control 31.

Figure 2:
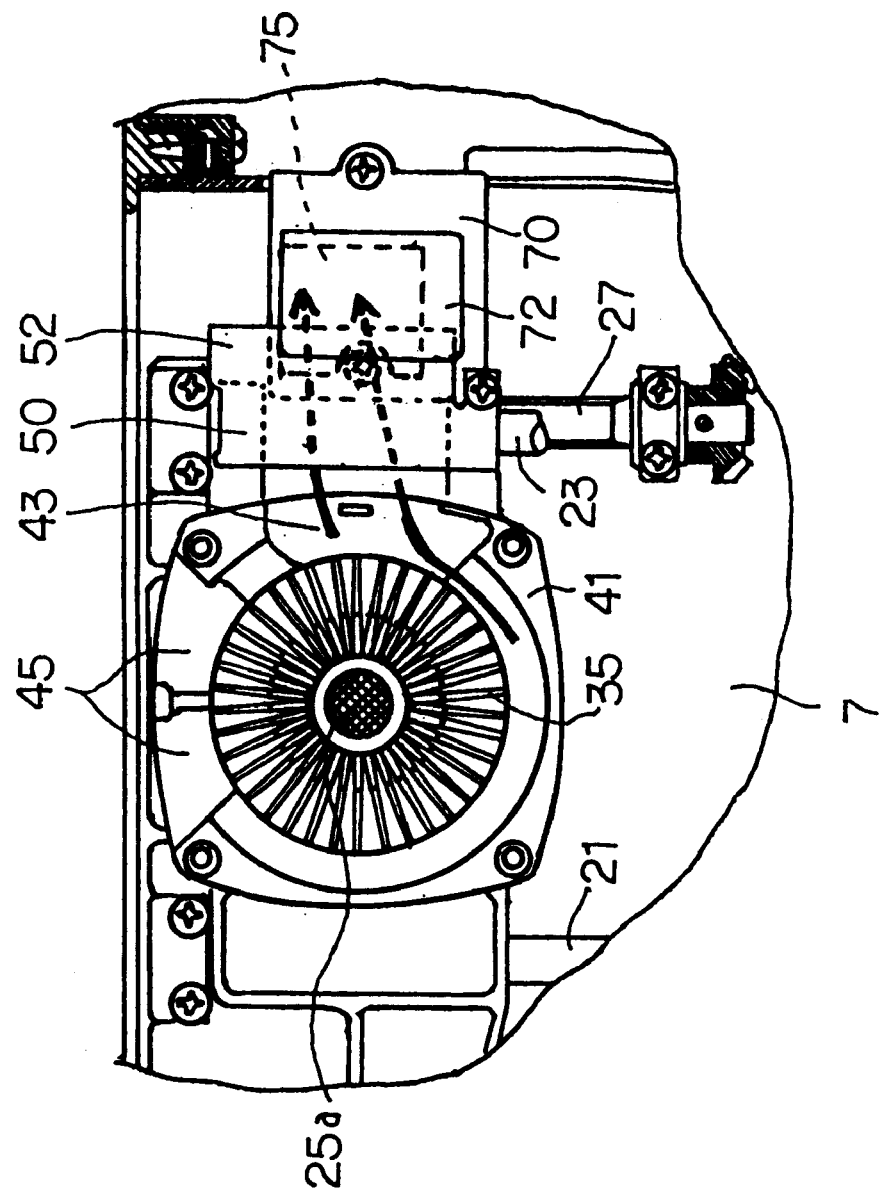
FIG. 2 is a fragmentary front view of the table saw according to the first embodiment showing an inner structure of a gear housing with a motor housing omitted.

Also, as shown in FIGS. 2 and 3, a cooling fan 35 is attached to a rotation axis 25a of the motor 25. By operating the motor 25, the cooling fan 35 is rotated to draw in air via openings 37a which are, as shown in FIG. 1, formed in a rear end of a motor housing 37. Then, the air is passed out of openings 43 and 45 which are formed in a gear housing 41. An air current is formed in the motor housing 37 to cool the motor 25.

Figure 5:
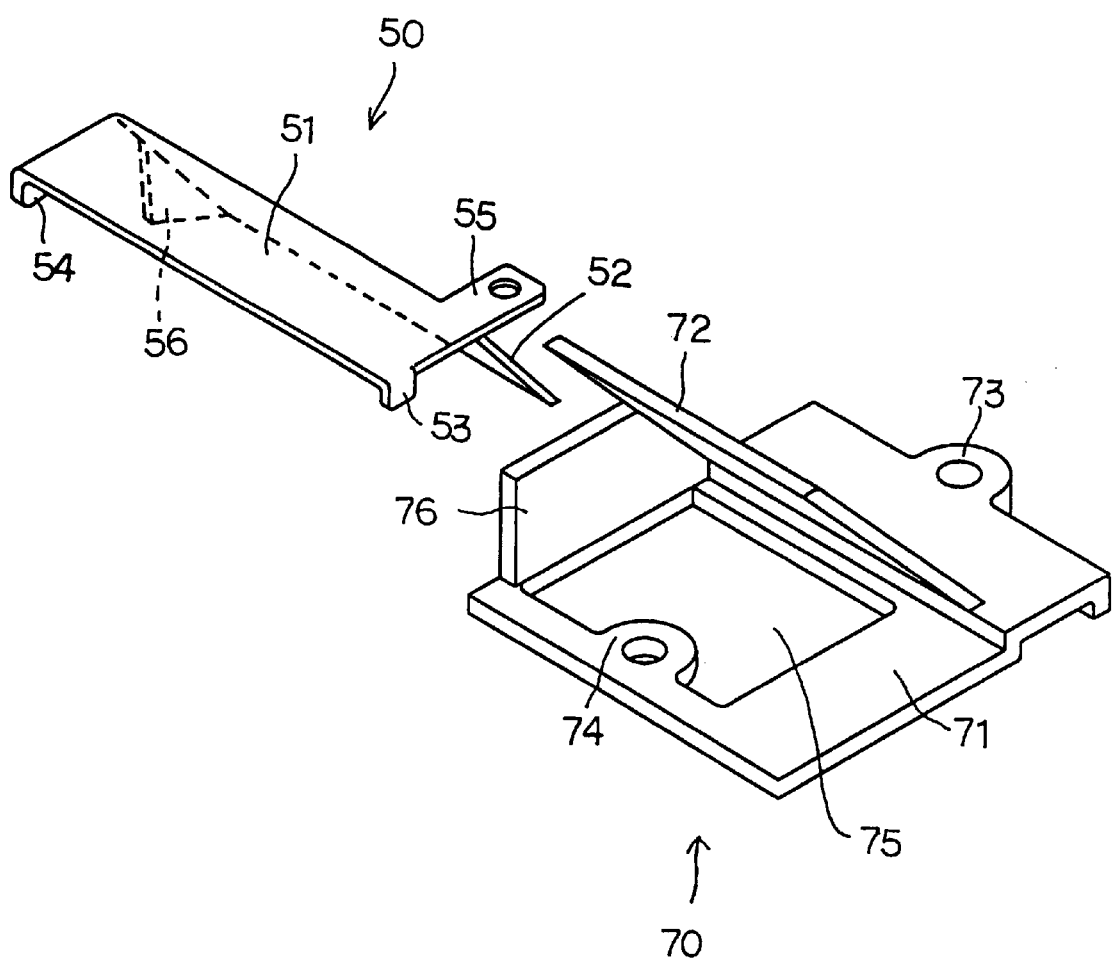
FIG. 5 is a perspective view showing guide members for guiding into a blade case an air current generated by a motor fan in the table saw of the first embodiment.

The first embodiment is characterized by a position of the opening 43 in the gear housing 41. Specifically, as shown in FIGS. 2 and 3, the opening 43 is formed in a front wall 41a of the gear housing 41. The opening 43 is hereinafter referred to as the forward opening 43. A motor guide member 50 is fixed with screws to the gear housing 41 for guiding the cooling air current blown through the forward opening 43 along a surface of the blade case 7. The motor guide member 50 is a stamped metal plate. As shown in FIGS. 2, 3 and 5, the motor guide member 50 is constituted of an attachment portion 51 and a first guide plate 52 which extends obliquely from the attachment portion 51 toward the blade case 7. The attachment portion 51 has detents 53 and 54 for engagement with the gear housing 41 and a screw lug 55. An upper edge of the first guide plate 52 is provided with a triangular upper covering 56 which is bent toward the blade case 7.

A through hole 61 is formed in an upper front portion of the blade case 7. A blade case guide member 70 extends over the through hole 61 on the outside and is attached to the outside of the blade case 7. The blade case guide member 70 may be of an injection molded synthetic resin. As shown in FIG. 5, the blade case guide member 70 is constituted of an attachment 71 and a second guide plate 72 which extends rearward from a front of the attachment portion 71. The second guide plate 72 extends obliquely at the substantially same angle as the first guide plate 52. The attachment portion 71 is provided with screw lugs 73 and 74 and an opening 75 which overlaps the through hole 61. In an upper edge of the opening 75, an upper wall 76 is formed and extends toward the second guide plate 72.

As shown by a dashed line in FIG. 3, the upper wall 76 of the second guide plate 72 and the upper covering 56 of the first guide plate 52 do not overlap each other. Also, the first and second guide plates 52 and 72 have no walls or coverings on lower portions thereof. Since the motor guide member 50 and the blade case guide member 70 do not overlap, the guide members 50 and 70 can pass each other when the motor 25 is moved vertically.

An inner structure of the blade case 7 will now be described with reference to FIGS. 4A and 4B. The through hole 61 is formed in a side wall 7a (the front-side wall shown in FIG. 1). About three-fourths of the through hole 61 from its upper end is covered with a cover member 81 integrally formed with the blade case 7 to cover the through hole 61 in the blade case 7. The cover member 81 has an inner wall 81a, an upper wall 81b, a front wall 81c and a rear wall 81d, and has an opening 83 in its lower portion. Also, as clearly seen in FIG. 4A, the through hole 61 opens in an upper portion of the front wall 7b of the blade case 7. A lower portion of the front wall 7b is formed by a curved portion 7c which smoothly interconnects a bottom face 7d and the front wall 7b. Additionally, a chip discharge port 85 is formed in a rear-end portion of the bottom face 7d. When the table saw 1 is operated, a dust bag (not shown) is preferably attached to the chip discharge port 85 in such a manner that chips resulting from wood processing can be contained in the dust bag.

Operation of the table saw 1 according to the first embodiment will be described.

As shown in FIG. 1, a relatively large-diameter circular saw blade 91 is mounted on the table saw 1. Also, as shown in FIGS. 3 and 4, a small-diameter grooving blade 92 may be mounted. In either case, when the motor 25 is moved to its most raised position and operated, the first embodiment is most effective.

When the motor 25 is moved to the most raised position, as shown in FIGS. 1 to 3, the first and second guide plates 52 and 72 overlap. As a result, the cooling air current blown from the forward opening 43 of the gear housing 41 flows forward along a rear face of the first guide plate 52. Further, the cooling air current flows along a rear face of the second guide plate 72 through the opening 75 and the through hole 61 into the blade case 7. As shown in FIGS. 1 and 4A, the cooling air current supplied into the blade case 7 hits the inner wall 81a of the cover member 81, and then changes its direction. Thereafter, the cooling air current flows downward along the front wall 7b of the blade case 7, and changes its direction to the rear side along the curved portion 7c below the front wall 7b. The cooling air current further flows rearward along the bottom face 7d, and is discharged via the chip discharge port 85.

As aforementioned, in the blade case 7, the air current flowing along the front wall 7b, the curved portion 7c and the bottom face 7d is formed. Consequently, after the chips resulting from the wood processing drop down into the blade case 7, the chips are blown via the chip discharge port 85 into the dust bag (not shown). Therefore, in the embodiment shown in FIGS. 1 and 4A, even when there is a large distance between the circular saw blade 91 or the grooving blade 92 and the blade case bottom face 7d, the chips are prevented from being deposited in the blade case 7. This can save the trouble of cleaning the blade case 7.

Further in the table saw 1 of the first embodiment, the case where the wood processing is performed by lowering the motor 25 to a condition in which the first and second guide plates 52 and 72 do not overlap each other will be described. In this condition, the cooling air current cannot be supplied into the blade case 7. Therefore, the chips cannot be discharged by the air current formed by the cooling air current. However, when the motor 25 is operated in a lowered position, usually the relatively large-diameter circular saw blade 91 is used. Therefore, when the motor 25 is lowered, a lower-end position of the circular saw blade 91 in the blade case 7 comes close to the case bottom face 7d. Instead of the air current resulting from the cooling air current, an air current is now generated by the rotation of the circular saw blade 91 for properly discharging the chips. When the circular saw blade 91 has a smaller diameter and a larger distance from the case bottom face 7d, an exposed quantity of the circular saw blade 91 is small. Therefore, the quantity of chips themselves is reduced. When there are only a small quantity of chips, the chips can be discharged by the air current produced by the circular saw blade 91.

While the preferred embodiment of the invention has been described, it is to be understood that the invention is not limited thereto, and may be otherwise embodied within the scope of the appended claims.

Figure 6:
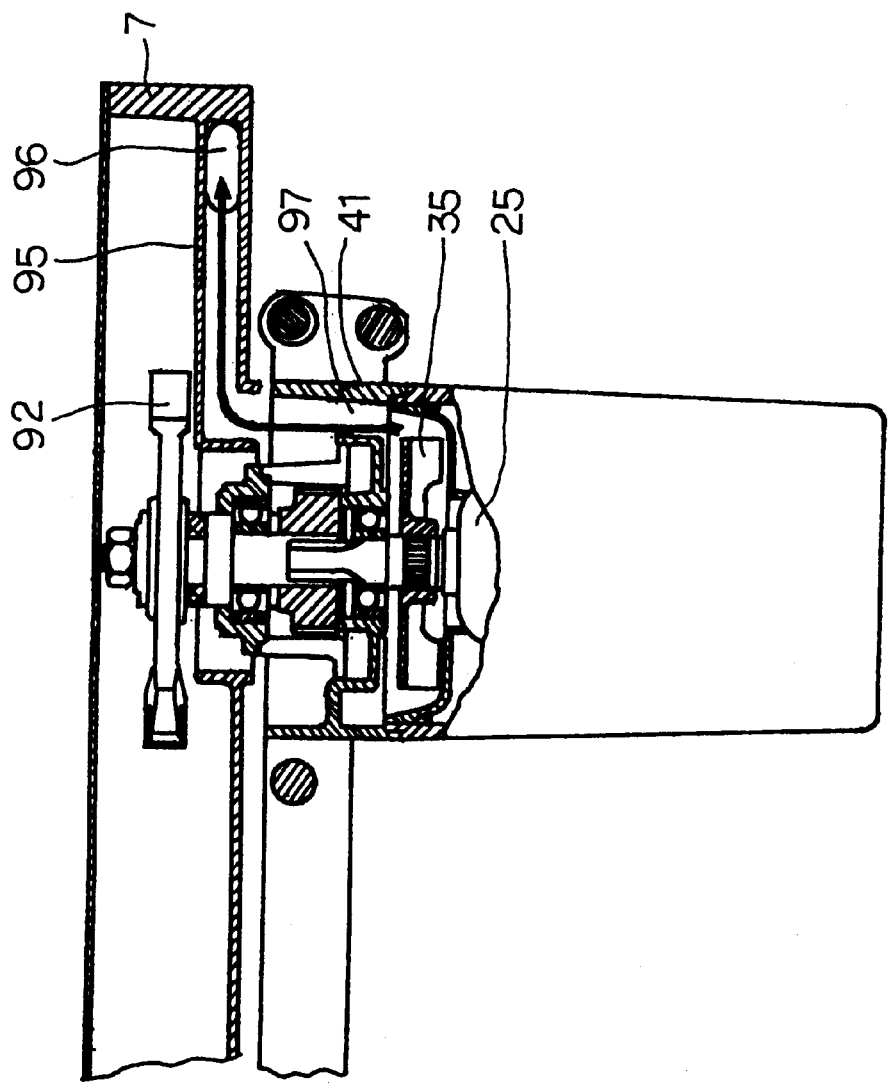
FIG. 6 is a sectional view showing the main portion of a second embodiment.
Figure 7A:
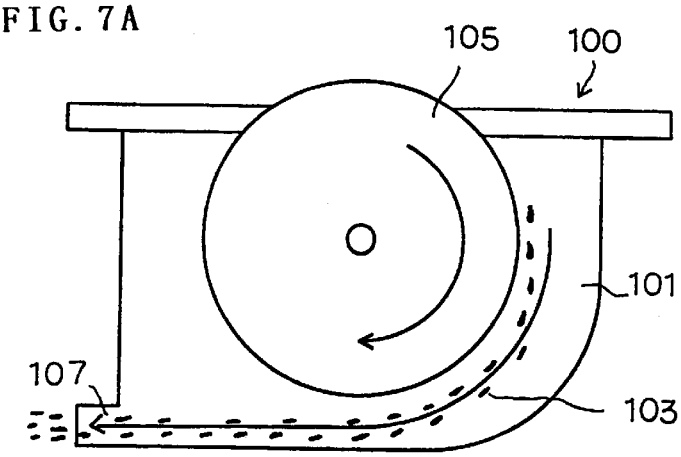
FIGS. 7A, 7B and 7C are diagrammatic views showing a prior-art table saw.
Figure 7B:
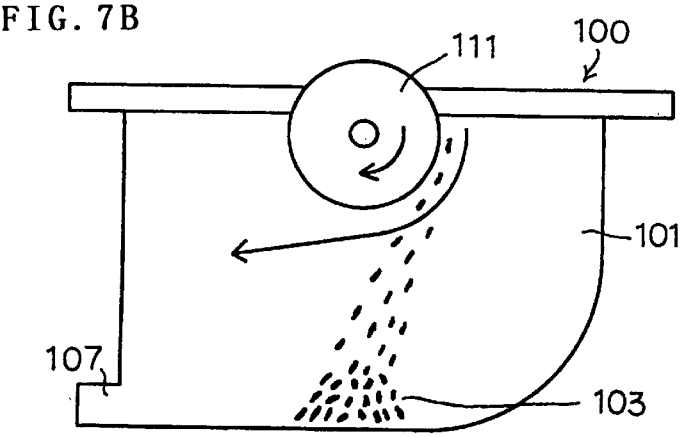
Figure 7C:
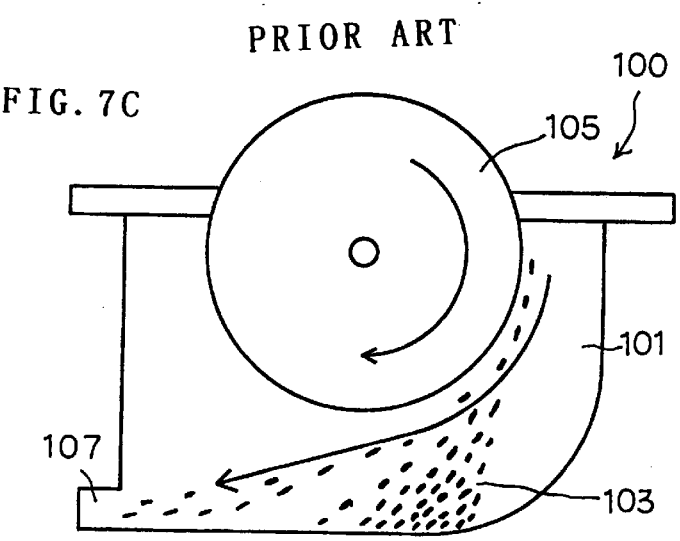

For example, a cooling air current guide path for supplying the cooling air current for the motor 25 into the blade case 7 is shown in FIG. 6, in which a duct 95 extending forward in the blade case 7 is connected to an opening 97 formed in the gear housing 41. A tip end of the duct 95 is provided with a downward opening 96. In this manner, the cooling air current can be supplied to the blade case 7. In the same manner as the aforementioned embodiment, an air current can be formed which flows along the front wall 7b, the curved portion 7c and the bottom face 7d. In this case, however, the structure is complicated. Further, since the duct 95 is disposed in a clearance between the rotary blade 92 and the blade case 7, the inner diameter of the duct cannot be made sufficiently large and the pressure drop of the cooling air current is increased. Therefore, the first embodiment is more practical in that a sufficiently strong air current can be formed in a simple structure. Additionally, the invention can be applied to a table saw in which an axial-flow fan is used as a motor cooling fan.

We claim:

1. A table saw comprising:

a table having a top surface;

a rotary blade axially connected to a motor for being driven thereby, with the rotary blade being vertically adjustable with respect to the table top surface;

a blade case attached to the table and covering a substantially lower half of said rotary blade, the blade case having a downward blowout port disposed therein and a chip discharge port provided in a rear bottom portion of the blade case; and an air current guide path disposed between the motor and the blade case for supplying an air current to the downward blowout port, the air current passing from the motor, along the air current guide path, through the downward blowout port, and into the blade case in order to propel chips produced by the blade toward and out of thin discharge port.

2. The table saw of claim 1 wherein the blade case is tiltably attached to the table.

3. The table saw of claim 1 wherein a fan is axially attached to the motor and disposed within the gear housing, the motor driving the fan in order to cool the motor and produce the air current.

4. The table saw of claim 1 wherein the motor guide member comprises a generally planar motor guide member attachment portion for attaching the motor guide member to the gear housing and a generally planar motor guide member guide plate, the motor guide member guide plate being obliquely integral with or attached to the motor guide member attachment portion.

5. The table saw of claim 1 wherein the blade case guide member comprises a generally planar blade case guide member attachment portion and the guide plate portion of the blade case guide member, and the blade case guide member guide plate portion being generally planar and being obliquely integral with or attached to the blade case guide member attachment portion.

6. The table saw of claim 5 wherein the blade case guide member attachment portion has a void disposed therein shaped complementary to the through hole, whereby when the blade case guide member is attached to the blade case proximate the through hole with the void and the through hole aligning, the air current is able to travel through the void and the through hole, through the downward blowout port and into the blade case.

7. A table saw comprising:

a table having a top surface;

a blade case tiltably attached to the table, the blade case having a downward blowout port disposed therein and a chip discharge port provided in a rear bottom portion of the blade case;

a rotary blade axially connected to a motor for being driven thereby, the motor being vertically adjustably attached to the blade case and the blade case covering substantially a lower half of the rotary blade; and an air current guide path disposed between the motor and the blade case for supplying an air current to the downward blowout port, the air current passing from the motor, along the air current guide path, through the downward blowout port, and into the blade case in order to propel chips produced by the blade toward and out of the discharge port.

8. The table saw of claim 7 wherein the motor guide member comprises a generally planar motor guide member attachment portion for attaching the motor guide member to the gear housing and a generally planar motor guide member guide plate, the motor guide member guide plate being obliquely integral with or attached to the motor guide member attachment portion.

9. The table saw of claim 7 wherein the blade case guide member comprises a generally planar blade case guide member attachment portion and a generally planar blade case guide member guide plate portion, and the blade case guide member guide plate portion being obliquely integral with or attached to the blade case guide member attachment portion.

* * * * *

UNITED STATES PATENT AND TRADEMARK OFFICE
CERTIFICATE OF CORRECTION

PATENT NO. : 6,009,782
DATED : January 4, 2000
INVENTOR(S) : Nobuo Tajima, et.al.

It is certified that error appears in the above-identified patent and that said Letters Patent is hereby corrected as shown below:

Column 7, line 16, replace "thin" with "the".

Column 7, line 16, after the word "port" add:

"wherein:

the motor is attached to a gear housing having at least one air current opening, with the motor and the gear housing being vertically adjustably attached to the blade case;

the air current guide path comprises a motor guide member attached to the gear housing proximate the at least one air current opening for guiding the air current forward along an outer side of the blade case from the air current opening, a through hole disposed in the blade case, and a blade case guide member attached to the outside of the blade case proximate the through hole, with a guide plate portion of the blade case guide member extending towards the motor guide member so that at least a tip portion of the guide plate portion overlaps a portion of the motor guide member;

the downward blowout port comprises the through hole disposed in the blade case covered by a cover member surrounding the through hole inside the blade case and having an opening in a lower portion thereof; and

UNITED STATES PATENT AND TRADEMARK OFFICE
CERTIFICATE OF CORRECTION

PATENT NO. : 6,009,782
DATED : January 4, 2000
INVENTOR(S) : Nobuo Tajima, et. al.

It is certified that error appears in the above-identified patent and that said Letters Patent is hereby corrected as shown below:

the motor guide member and the blade case guide member are aligned such that when the motor is adjusted vertically with respect to the blade case, the overlapping portions of the guide members pass over each other without interference"

UNITED STATES PATENT AND TRADEMARK OFFICE
CERTIFICATE OF CORRECTION

PATENT NO. : 6,009,782
DATED : January 4, 2000
INVENTOR(S) : Nobuo Tajima, et. al.

It is certified that error appears in the above-identified patent and that said Letters Patent is hereby corrected as shown below:

Column 8, line 22, after the word "port" add:

"wherein:

the motor is attached to a gear housing and has a fan axially attached thereto for providing the air current;

at least one air passage opening is disposed in the gear housing; and the air current guide path comprises a motor guide member attached to the gear housing proximate the at least one air passage opening, and a blade case guide member attached to the blade case proximate the downward blowout port, the motor guide member and the blade case guide member being vertically oriented with respect to one another such that at least a portion of the motor guide member and the blade case guide member overlap when the motor is vertically adjusted up to at least a middle area of the blade case"

Signed and Sealed this

Fifth Day of December, 2000

Attest:

Attesting Officer

Q. TODD DICKINSON

Director of Patents and Trademarks